United States Patent
Zhang et al.

(10) Patent No.: US 9,378,345 B2
(45) Date of Patent: Jun. 28, 2016

(54) AUTHENTICATION USING DEVICE ID

(71) Applicant: Bank of America Corporation, Charlotte, NC (US)

(72) Inventors: Xianhong Zhang, Issaquah, WA (US); Andrew Keys, Albany, OR (US); Kapil Pruthi, Bothell, WA (US)

(73) Assignee: Bank of America Corporation, Charlotte, NC (US)

(*) Notice: Subject to any disclaimer, the term of this patent is extended or adjusted under 35 U.S.C. 154(b) by 2 days.

(21) Appl. No.: 14/264,682

(22) Filed: Apr. 29, 2014

(65) Prior Publication Data
US 2015/0310194 A1   Oct. 29, 2015

(51) Int. Cl.
*H04L 29/06* (2006.01)
*G06F 21/31* (2013.01)

(52) U.S. Cl.
CPC ............... *G06F 21/31* (2013.01); *H04L 63/10* (2013.01)

(58) Field of Classification Search
CPC ......... G06F 21/31; G06F 21/30; G06F 21/33; H04L 63/10; H04L 9/32
USPC .................. 726/9, 2, 25, 26, 27, 28
See application file for complete search history.

(56) References Cited

U.S. PATENT DOCUMENTS

| | | | |
|---|---|---|---|
| 6,760,841 B1* | 7/2004 | Fernandez | 713/172 |
| 8,060,916 B2* | 11/2011 | Bajaj et al. | 726/3 |
| 8,145,560 B2 | 3/2012 | Kulkarni et al. | |
| 8,151,327 B2 | 4/2012 | Eisen | |
| 8,615,809 B2 | 12/2013 | Bajaj et al. | |
| 2002/0169988 A1* | 11/2002 | Vandergeest | H04L 63/126 726/4 |
| 2003/0172271 A1* | 9/2003 | Silvester | H04L 63/08 713/170 |
| 2004/0116115 A1* | 6/2004 | Ertel | H04W 4/00 455/426.2 |
| 2007/0130473 A1* | 6/2007 | Mazotas | 713/183 |
| 2008/0244744 A1 | 10/2008 | Thomas et al. | |
| 2009/0055910 A1 | 2/2009 | Lee | |
| 2009/0129400 A1 | 5/2009 | Dibiaso et al. | |
| 2010/0017596 A1 | 1/2010 | Schertzinger | |
| 2010/0291952 A1* | 11/2010 | Gosset et al. | 455/466 |
| 2010/0312702 A1 | 12/2010 | Bullock | |
| 2010/0332337 A1 | 12/2010 | Bullock | |
| 2011/0030065 A1* | 2/2011 | Kulakowski | H04N 21/6334 726/26 |
| 2011/0288940 A1 | 11/2011 | Horadan et al. | |
| 2012/0060207 A1* | 3/2012 | Mardikar et al. | 726/4 |
| 2012/0087493 A1* | 4/2012 | Chidambaram | H04L 9/0841 380/44 |
| 2012/0215896 A1 | 8/2012 | Johannsen | |
| 2013/0036434 A1 | 2/2013 | Shkedi et al. | |

(Continued)

FOREIGN PATENT DOCUMENTS

| | | |
|---|---|---|
| GB | 2434724 | 8/2007 |
| WO | 2008127422 | 10/2008 |

*Primary Examiner* — Sarah Su
(74) *Attorney, Agent, or Firm* — Banner & Witcoff, Ltd.; Michael A. Springs

(57) ABSTRACT

A system for authenticating a customer is disclosed. The customer may attempt to access protected resources located at an authentication server. The customer may log in to the authentication server's website, thereby submitting an authentication request. The authentication request may comprise attributes of the device the customer uses to log in. The authentication server may generate a device ID using the received device attributes and generate an authentication token that is signed with the device ID. The authentication server may transmit the authentication token to the client device. Subsequent requests to access protected resources from the client device may include the authentication token that is signed with the device ID.

20 Claims, 3 Drawing Sheets

(56) References Cited

U.S. PATENT DOCUMENTS

| | | | |
|---|---|---|---|
| 2013/0145140 A1* | 6/2013 | Hsien | 713/2 |
| 2013/0254169 A1 | 9/2013 | Barber | |
| 2013/0276115 A1 | 10/2013 | Hu | |
| 2013/0305059 A1* | 11/2013 | Gormley et al. | 713/189 |
| 2013/0322438 A1* | 12/2013 | Gospodarek | H04L 63/1466 370/389 |
| 2014/0020083 A1* | 1/2014 | Fetik | 726/11 |
| 2014/0047238 A1* | 2/2014 | Harty | H04L 9/3236 713/168 |
| 2014/0082369 A1* | 3/2014 | Waclawsky | G06F 21/62 713/189 |
| 2014/0095873 A1* | 4/2014 | Mulla et al. | 713/168 |
| 2014/0237236 A1* | 8/2014 | Kalinichenko et al. | 713/168 |
| 2014/0259116 A1* | 9/2014 | Birk et al. | 726/4 |
| 2015/0100788 A1* | 4/2015 | Chastain et al. | 713/169 |
| 2015/0200780 A1* | 7/2015 | Vantaggiato | H04L 9/3213 713/159 |

\* cited by examiner

AUTHENTICATION USING DEVICE ID

TECHNICAL FIELD

Aspects of the disclosure relate generally to a system and method for generating authentication tokens. Specifically, aspects of the disclosure relate to an authentication server that generates authentication tokens signed with a device ID.

BACKGROUND

Within a typical authenticated website, when a customer successfully authenticates into the website's server, the server generates an authentication token for that customer's session. This authentication token bears the proof that the customer has been successfully authenticated within the session. Any subsequent requests to the server for protected resources must include the token so that the server may validate that the customer is indeed authenticated prior to serving the request. The authentication token is typically carried through browser cookies. Most authenticated websites use this authentication token as the sole means for determining whether the customer is authenticated. One significant disadvantage of this approach is that once the token is stolen, the token thief will be able to replay the customer's session from any device before the token expires. Thus, there is a need for an additional level of security added to authentication tokens.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Certain aspects disclose a method comprising: receiving, at an authentication server, an authentication request, wherein the authentication request comprises device attributes; generating, at the authentication server, a device ID using the device attributes; creating, at the authentication server, an authentication token, wherein the authentication token is signed with the device ID; transmitting, at the authentication server, the authentication token; receiving, at the authentication server, a request to access protected resources, wherein the request comprises the authentication token and device attributes; generating, at the authentication server, a comparison device ID based on the device attributes included in the request to access protected resources; decrypting, at the authentication server, the authentication token; retrieving, at the authentication server, the device ID generated from the decrypted authentication token; validating, at the authentication server, the authentication token, wherein the validating comprises determining whether the device ID matches the comparison device ID; and outputting, at the authentication server, a response.

Certain other aspects disclose a non-transitory computer-readable storage medium having computer-executable program instructions stored thereon that, when executed by a processor, cause the processor to: receive an authentication request, wherein the authentication request comprises device attributes; generate a device ID using the device attributes; create an authentication token, wherein the authentication token is signed with the device ID; transmit the authentication token; receive a request to access protected resources, wherein the request comprises the authentication token and device attributes; generate a comparison device ID based on the device attributes included in the request to access protected resources; decrypt the authentication token; retrieve the device ID generated from the decrypted authentication token; validate the authentication token, wherein the validating comprises determining whether the device ID matches the comparison device ID; and output a response.

Certain other aspects disclose an apparatus comprising: a memory; a processor, wherein the processor executes computer-executable program instructions which cause the processor to: receive an authentication request, wherein the authentication request comprises device attributes; generate a device ID using the device attributes; create an authentication token, wherein the authentication token is signed with the device ID; transmit the authentication token; receive a request to access protected resources, wherein the request comprises the authentication token and device attributes; generate a comparison device ID based on the device attributes included in the request to access protected resources; decrypt the authentication token; retrieve the device ID generated from the decrypted authentication token; validate the authentication token, wherein the validating comprises determining whether the device ID matches the comparison device ID; and output a response.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain principles of the disclosure. In the drawings:

DETAILED DESCRIPTION

In accordance with various aspects of the disclosure, methods, non-transitory computer-readable media, and apparatuses are disclosed for authenticating a user's identity. In certain aspects, when a server receives a request data from a computing device, the server processes and analyzes the request and provides the requested data. The automated process may utilize various hardware components (e.g., processors, communication servers, memory devices, and the like) and related computer algorithms to generate image data related to the agency's business data.

Figure 1:
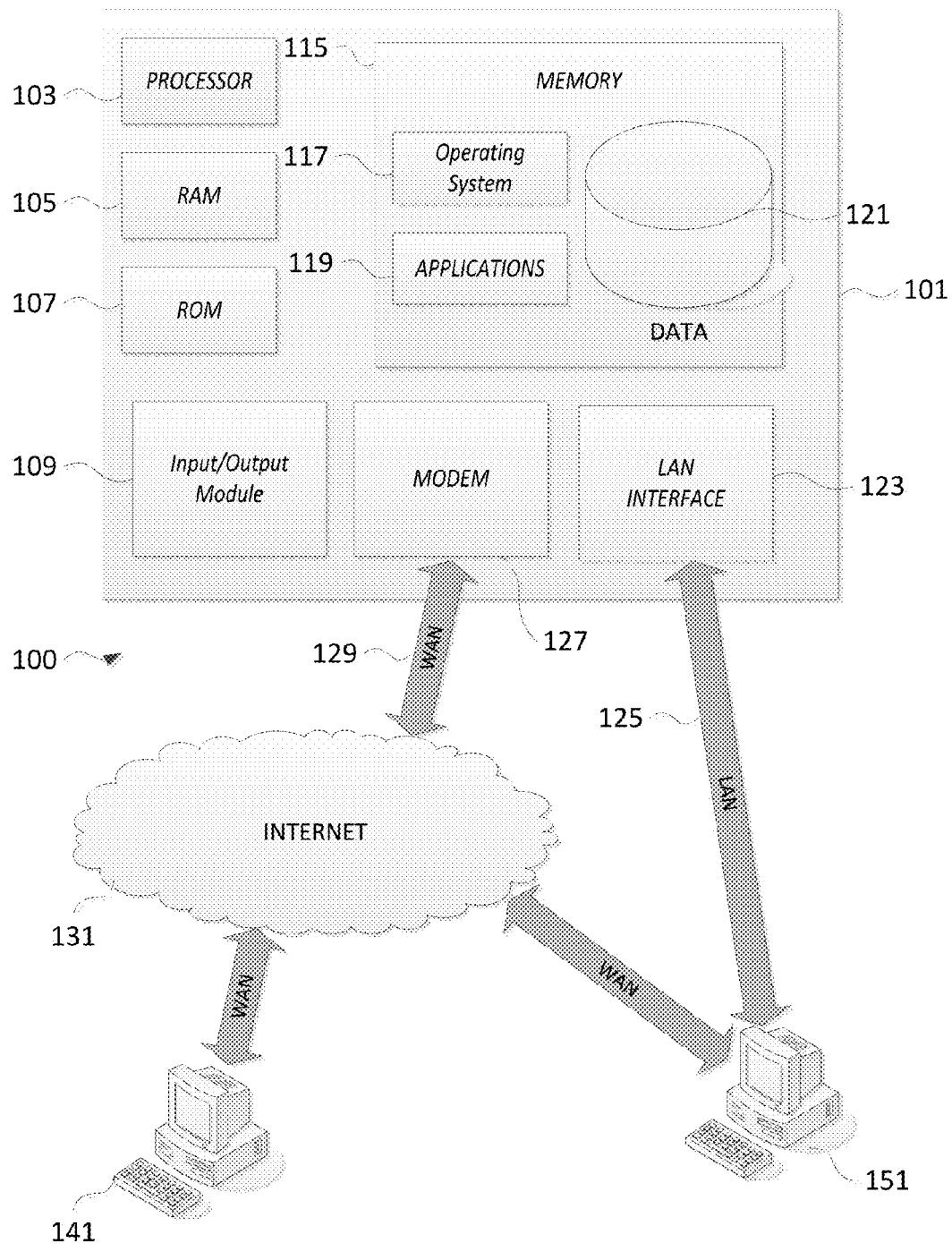
FIG. 1 shows an illustrative operating environment in which various aspects of the disclosure may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system environment 100 may include an authentication server 101 wherein the processes discussed herein may be implemented. The authentication server 101 may have a processor 103 for controlling the overall operation of the authentication server 101 and its associated components, including random-access memory (RAM) 105, read-only memory (ROM) 107, communications module 109, and memory 115. Processor 103 and its associated components may allow the authentication server 101 to run a series of computer-readable instructions related to receiving, storing, and analyzing data.

Authentication server 101 typically includes a variety of computer-readable media. Computer-readable media may be any available media that may be accessed by authentication server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by authentication server 101.

Computing system environment 100 may also include optical scanners (not shown). Exemplary usages include scanning and converting paper documents, such as correspondence, data, and the like to digital files.

Although not shown, RAM 105 may include one or more applications representing the application data stored in RAM 105 while the authentication server 101 is on and corresponding software applications (e.g., software tasks) are running on the authentication server 101.

Communications module 109 may include a microphone, keypad, touch screen, and/or stylus through which a user of authentication server 101 may provide input, and may also include one or more of a speaker for providing audio output and a video display device for providing textual, audiovisual and/or graphical output.

Software may be stored within memory 115 and/or storage to provide instructions to processor 103 for enabling authentication server 101 to perform various functions. For example, memory 115 may store software used by the authentication server 101, such as an operating system 117, application programs 119, and an associated database 121. In certain aspects, authentication server 101 may comprise a plurality of databases 121. Also, some or all of the computer executable instructions for authentication server 101 may be embodied in hardware or firmware.

Authentication server 101 may operate in a networked environment supporting connections to one or more remote computing devices, such as computing devices 141 and 151. The computing devices 141 and 151 may be personal computing devices or servers that include many or all of the elements described above relative to the authentication server 101.

The network connections depicted in FIG. 1 include a local area network (LAN) 125 and a wide area network (WAN) 129, but may also include other networks. When used in a LAN networking environment, authentication server 101 may be connected to the LAN 125 through a network interface 123 or adapter. When used in a WAN networking environment, the authentication server 101 may include a modem 127 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate web pages.

Additionally, one or more application programs 119 used by the authentication server 101, according to an illustrative embodiment, may include computer executable instructions for invoking functionality related to communication including, for example, email short message service (SMS), and voice input and speech recognition applications. In addition, the application programs 119 may include computer executable instructions for invoking user functionality related to access a centralized repository for performing various service tasks like routing, logging, and protocol bridging.

Embodiments of the disclosure may include forms of computer-readable media. Computer-readable media include any available media that can be accessed by an authentication server 101. Computer-readable media may comprise storage media and communication media and in some examples may be non-transitory. Storage media include volatile and non-volatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on authentication server 101. Such a processor may execute computer-executable instructions stored on a computer-readable medium.

Figure 2:
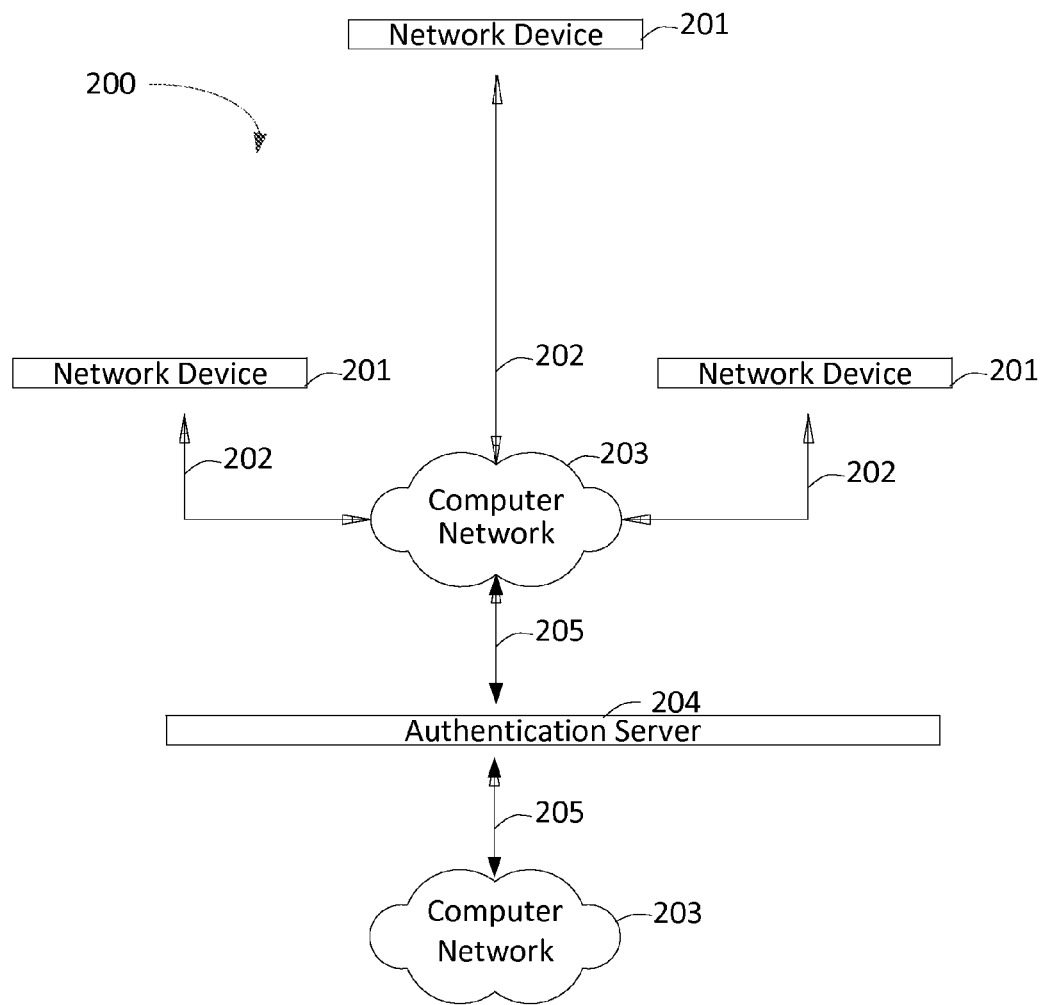
FIG. 2 shows an illustrative block diagram of network devices and server that may be used to implement the processes and function of one or more aspects of the present disclosure.

FIG. 2 illustrates another example operating environment in which various aspects of the disclosure may be implemented. As illustrated, system 200 may include one or more network devices 201. Network devices 201 may, in some examples, be connected by one or more communications links 202 to computer network 203 that may be linked via communications links 205 to server 204. In system 200, server 204 may be any suitable server, processor, computer, or data processing device, or combination of the same. Server 204 may be used to process the instructions received from, and the transactions entered into by, one or more participants.

According to one or more aspects, system 200 may be associated with a financial institution, such as a bank. Various elements may be located within the financial institution and/or may be located remotely from the financial institution. For instance, one or more network devices 201 may be located within a branch office of a financial institution. Such network devices may be used, for example, by customer service representatives, other employees, and/or customers of the financial institution in conducting financial transactions via network 203. Additionally or alternatively, one or more network devices 201 may be located at a user location (e.g., a customer's home or office). Such network devices also may be used, for example, by customers of the financial institution in conducting financial transactions via computer network 203. In some aspects, network devices 201 a server such as authentication server 101.

Computer network 203 may be any suitable computer network including the Internet, an intranet, a wide-area network (WAN), a local-area network (LAN), a wireless network, a digital subscriber line (DSL) network, a frame relay network, and asynchronous transfer mode network, a virtual private network (VPN), or any combination of any of the same. Communications links 202 and 205 may be any communications links suitable for communicating between network devices 201 and server 204, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

Figure 3:
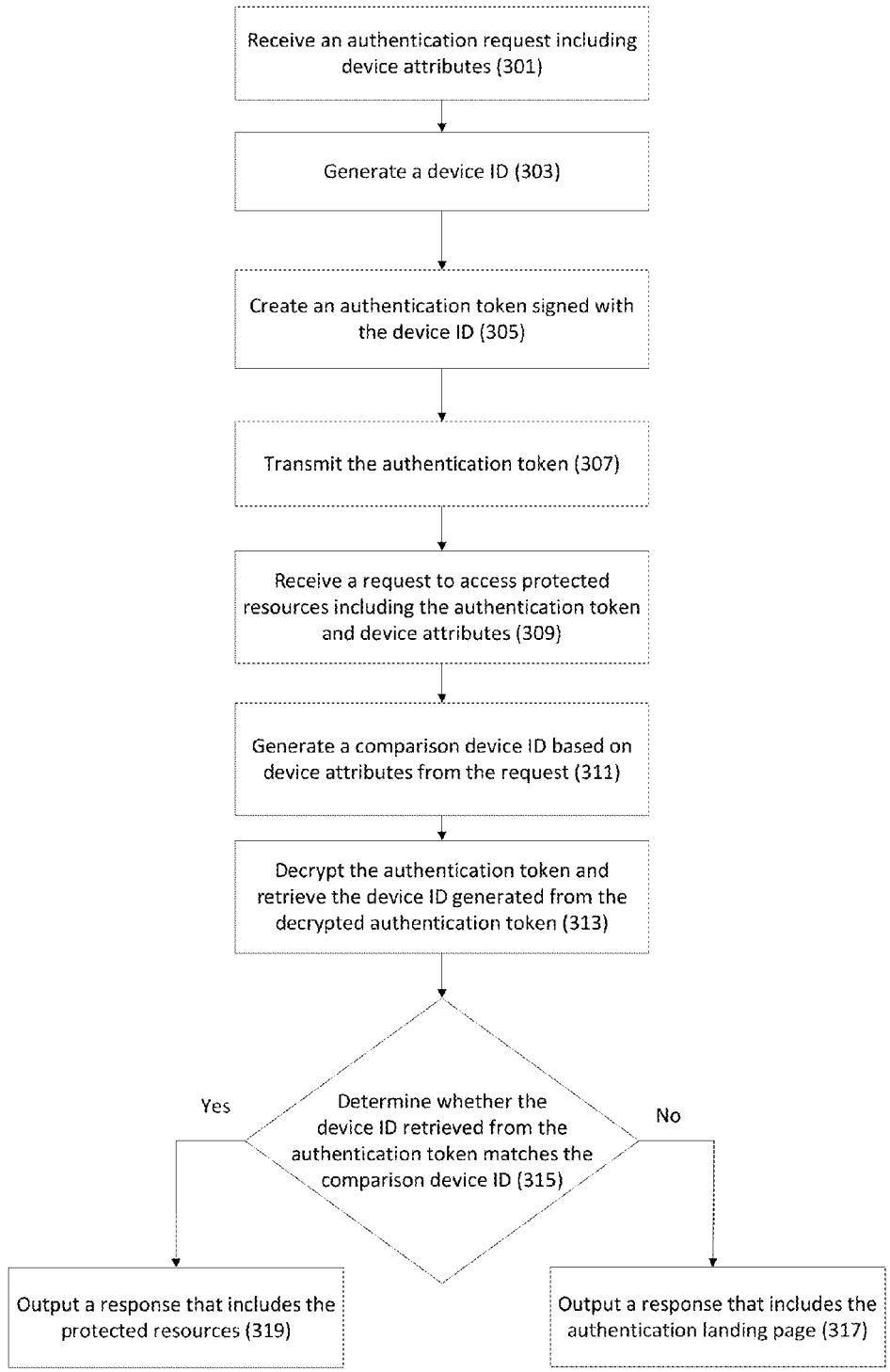
FIG. 3 shows an illustrative flow chart in accordance with aspects of the disclosure.

FIG. 3 illustrates an exemplary flow chart according to aspects of the disclosure. Specifically, FIG. 3 illustrates an exemplary process for authenticating a user who may be attempting to access protected resources at an authentication server 101. The authentication server 101 may host a website associated with a financial institution, such as a bank. A user, such as a bank customer, may access the authentication server 101 to view protected resources. Protected resources may comprise information that may be outputted by authentication server 101 after a user has been authenticated. In the example of a financial institution, protected resources may comprise at least one of an authenticated customer's account balance, account overview, bill pay functions, payment transfers, and the like.

A user may access protected resources via a computing device, such as computing device 141. In some aspects, the user may launch a browser stored at the computing device and enter a website hosted by authentication server 101 to access protected resources. In some other aspects, the computing device 151 may comprise a mobile device, such as a mobile phone. The user may launch a mobile application stored on the mobile phone to access the protected resources from authentication server 101. In either aspect, upon first entering the website via the browser or upon first launching the mobile application, authentication server 101 may output a prompt requiring the user to enter log in information. The log in information may comprise one or more of a username, password, challenge question and answer, pin number, and the like.

After the user has entered his/her log in information, the user may select an option to submit the information to authentication server 101 in the form of an authentication request. In certain aspects, the user may transmit the authentication request from a browser stored at computing device 141. The browser may comprise computer programming script such as JavaScript. The script may be configured to retrieve device attributes from computing device 141. The device attributes may uniquely identify the device from which the user is submitting the authentication request. Device attributes may comprise at least one of a device operating system, a device type, and a device serial number. The script may retrieve the device attributes from the operating system running on computing device 141. For example, the script may perform application calls or interact with an application programming interface to retrieve the device attributes. In some aspects, the script may retrieve the device attributes after the user has selected the option to submit the authentication request. The script may retrieve the device attributes at other times.

In some aspects, the user may submit an authentication request from a mobile application stored at a mobile computing device 151. The mobile application may comprise a client-side software development kit (SDK). Similar to the script stored at a browser, the client-side SDK may retrieve device attributes of the mobile computing device 151 after the user has selected the option to submit the authentication request. The client-side SDK may also retrieve the device attributes at other times. When the user selects the option to submit the authentication request, the computing device 151 may also transmit the device attributes to authentication server 101. Thus, the authentication request may comprise the user's log in information and device attributes.

At step 301, authentication server 101 may receive the authentication request including the device attributes. Authentication server 101 may comprise one or more application components, such as an authentication component and a protected resources component. The authentication component may be used to receive authentication requests, generate authentication tokens and device IDs, and transmit authentication tokens. Protected resources component may be used to receive and validate tokens, and to output protected resources.

After receiving the authentication request and device attributes at step 301, authentication server 101 may generate a device ID at step 303. Authentication server 101 may generate a device ID using the received device attributes. The device ID may comprise a string of randomly generated characters that uniquely and persistently identify the device from which the user submitted the authentication request (such as computing device 141 or computing device 151). In some aspects, the authentication server 101 may only generate a device ID after determining that the user's log in information is valid. For instance, authentication server 101 may compare the log in information included in the authentication request with log in information stored at memory 115. If the received log in information matches the stored log in information, authentication server 101 may generate the device ID at step 303. If authentication server 101 determines that the log in information is invalid, authentication server 101 may output an authentication landing web page where the user may once again be prompted to log in.

After generating the device ID at step 303, authentication server 101 may create an authentication token signed with the device ID at step 305. The authentication server 101 may create an authentication token using one of the many known methods in the art. However, in order to uniquely identify the user's computing device, authentication server 101 may sign the authentication token with the generated device ID. In other words, the authentication token may be encrypted with the device ID such that the authentication token comprises the device ID. Authentication server 101 may store the device ID at database 121. Authentication server 101 may also associate the device ID with other customer information, such as the customer's name, account information, device attributes, customer ID, and the like. Therefore, the authentication server 101 may be able to quickly identify a customer based on a device ID or authentication token signed with a device ID.

At step 307, authentication server 101 may transmit the authentication token to the computing device that transmitted the authentication request (such as computing device 141 or computing device 151). For instance, a financial institution customer may transmit an authentication request from computing device 141. After authentication server reviews the log in information in the authentication request, it may generate a device ID used to sign an authentication token for the customer. Authentication server 101 may then transmit the authentication token to the computing device 141 at step 307. If the authentication request was received from a browser stored on computing device 141, authentication server 101 may transmit the authentication token in the form of a cookie. The cookie may comprise the device ID generated at step 303. Computing device 141 may receive the cookie at step 307 and store the cookie within the browser. The browser may store the cookie encrypted with the device ID for an extended period of time, such as days, weeks, months, or years.

In some aspects, the authentication server 101 may receive an authentication request from a mobile application stored on a mobile computing device 151. In response, authentication server 101, after validating that the log in information provided within the authentication request is valid, may generate a device ID used to sign an authentication token. Authentication server 101 may then transmit the authentication token to the mobile application as a token that may be stored in the mobile application's current session. The authentication token may be stored at the mobile application's session for the length of the current session, or in some cases, for an extended period of time.

After the customer's computing device has received and stored the authentication token from authentication server 101, the computing device may transmit the authentication token to authentication server 101 in conjunction with subsequent requests to access protected resources from authentication server 101. Each subsequent time a customer submits a request to access protected resources (such as bank account information) from the authentication server 101, the customer's computing device may submit an authentication token along with the request for protected resources.

At step 309, authentication server 101 may receive a request to access protected resources that includes the authentication token and device attributes. The device attributes may be received from the client's device using script or client-side SDK, as described above for step 301. In some cases, an authentication token may be received from a separate device from the device for which the authentication token and device ID were generated. For example, a token thief may attempt to access a customer's protected resources by stealing an authentication token from the customer and using the authentication token to access protected resources on the thief's device. In some other cases, an authentication token may be an attempt to mimic a previously generated authentication token. However, if the request to access protected resources is made from the device for which the authentication token and device ID were generated (such as computing device 141 and computing device 151 in the examples above) the device attributes should be the same as those received at step 301. In either case, authentication server 101 may receive a request to access protected resources, wherein the request includes an authentication token and device attributes at step 309.

At step 311, authentication server 101 may generate a comparison device ID based on the device attributes included in the request received at step 309. The authentication server 101 may generate the comparison device ID similar to how it generated the device ID at step 303. For example, memory 115 may store one or more algorithms or instructions for generating device ID's and comparison device ID's based on received device attributes. The algorithms or instructions stored in memory 115 may ensure that a single device ID or comparison device ID is generated for a single set of device attributes. In other words, when authentication server 101 receives a set of device attributes, authentication server may generate a device ID. Then, when authentication server 101 later receives the same set of device attributes, authentication server may generate a comparison device ID that is identical to the device ID. Thus, the device ID and comparison device ID may be identical when generated using identical device attributes.

Conversely, if authentication server 101 receives a first set of device attributes, it may generate a device ID. If authentication server 101 later receives a second set of device attributes, it may generate a comparison device ID that is different from the device ID. In other words, the device ID and comparison device ID may be different when generated using device attributes that are not identical.

At step 313, authentication server 101 may decrypt the authentication token it received at step 309 and retrieve the device ID generated from the decrypted authentication token. Authentication server 101 may use one or more well-known decryption methods to decrypt the authentication token. After decrypting the authentication token, authentication server 101 may be able to retrieve the device ID that was previously encrypted in the authentication token. Recall that authentication server 101 generated the device ID at step 303 using device attributes included in an authentication request at step 301. Now, at step 313, the device ID is retrieved from a decrypted authentication token included in a user's request from a device to access protected resources.

At step 315, authentication server 101 may validate the authentication token by determining whether the device ID retrieved from the authentication token matches the comparison device ID. Authentication server 101 may perform this step at the protected resources component after first decrypting the received authentication token. Authentication server 101 may compare the device ID retrieved at step 313 with the comparison device ID generated at step 311. By comparing the device ID with the comparison device ID, authentication server 101 may be able to determine whether the request to access protected resources at step 309 is coming from the same device at submitted an authentication request at step 301 and for which the authentication toked signed with the device ID was created at step 305. Because both the device ID and comparison ID were created using attributes of the device transmitting an authentication request and a request to access protected resources, respectively, an identical device ID and comparison device ID may indicate that the requests were submitted from the same device. Likewise, when the device ID is not the same as the comparison device ID, authentication server 101 may determine that the request to access protected resources comes from a device that was not validated to use the authentication token.

After authentication server 101 validates the authentication token, authentication server 101 may output a response. If, at step 315, authentication server 101 determines that the authentication token does not include the device ID, the response may comprise outputting an authentication landing page at step 317. The authentication landing page may comprise a prompt requesting the customer to input log in information, such as a username and password. The authentication landing page may comprise a web page displayed at a browser or may be displayed at a mobile application.

If, instead, authentication server 101 determines that the authentication token includes the device ID, or in other words, the authentication token consists of a valid authentication token, at step 319 authentication server 101 may output a response that includes the protected resources for which a request was received at step 309. The protected resources may be displayed at a web page on a browser or may be displayed at a mobile application. The customer may view and enter further commands after receiving the protected resources. Subsequent requests to view protected resources may comprise the steps shown at FIG. 3, beginning at step 309.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software by the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM.

What is claimed is:

1. A method, comprising:
receiving, by an authentication server and from a user device, an authentication request, wherein the authentication request comprises device attributes of the user device and wherein the authentication request further includes login information of a user;
determine, by the authentication server, whether the login information is valid;
responsive to determining that the login information is valid, generating, by the authentication server, a first device identifier identifying the user device from which the authentication request was received using the device attributes of the user device from which the authentication request was received, the first device identifier includes randomly generated characters that uniquely identify the user device from which the authentication request was received and the first device identifier is generated based on the device attributes that uniquely identify the user device from which the authentication request was received;
creating, by the authentication server, an authentication token, wherein the authentication token is signed with the first device identifier;
transmitting, by the authentication server and to the user device from which the authentication request was received, the authentication token;
receiving, by the authentication server, a request to access protected resources from a user device, wherein the request comprises the authentication token and device attributes of the user device from which the request to access protected resources was received;
generating, by the authentication server, a second, comparison device identifier identifying the user device from which the request to access protected resources was received, the second, comparison device identifier being based on the device attributes of the user device from which the request to access protected resources was received and included in the request to access protected resources, the second, comparison device identifier including randomly generated characters that uniquely identify the user device from which the request to access protected resources was received and the second, comparison device identifier is generated based on the device attributes of the user device from which the request to access protected resources was received and included in the request to access protected resources that uniquely identify the user device from which the request to access protected resources was received;
decrypting, by the authentication server, the received authentication token;
retrieving, by the authentication server, the first device identifier accessed from the decrypted authentication token;
validating, by the authentication server, the authentication token, wherein the validating comprises determining whether the first device identifier matches the second, comparison device identifier; and
outputting, by the authentication server, a response.

2. The method of claim 1, wherein the response comprises the protected resources if the first device identifier matches the second, comparison device identifier.

3. The method of claim 1, wherein the response comprises an authentication landing page if the first device identifier does not match the second, comparison device identifier.

4. The method of claim 1, wherein the device attributes are received using a client-side software development kit.

5. The method of claim 1, wherein the device attributes are received using a script.

6. The method of claim 1, wherein the device attributes comprise at least one of a device operating system, a device type, and a device serial number.

7. The method of claim 1, wherein the login information of the user includes a username and password.

8. A non-transitory computer-readable storage medium having computer-executable program instructions stored thereon that, when executed by a processor, cause the processor to:
receive, from a user device, an authentication request, wherein the authentication request comprises device attributes of the user device and wherein the authentication request includes login information of the user;
determine whether the login information is valid;
responsive to determining that the login information is valid, generate a first device identifier identifying the user device from which the authentication request was received using the device attributes of the user device from which the authentication request was received, the first device identifier includes randomly generated characters that uniquely identify the user device from which the authentication request was received and the first device identifier is generated based on the device attributes that uniquely identify the user device from which the authentication request was received;
create an authentication token, wherein the authentication token is signed with the first device identifier;
transmit, to the user device from which the authentication request was received, the authentication token;
receive a request to access protected resources from a user device, wherein the request comprises the authentication token and device attributes of the user device from which the request to access protected resources was received;

generate a second, comparison device identifier identifying the user device from which the request to access protected resources was received, the second, comparison device identifier being based on the device attributes of the user device from which the request to access protected resources was received and included in the request to access protected resources, the second, comparison device identifier including randomly generated characters that uniquely identify the user device from which the request to access protected resources was received and the second, comparison device identifier is generated based on the device attributes of the user device from which the request to access protected resources was received and included in the request to access protected resources that uniquely identifying the user device from which the request to access protected resources was received;

decrypt the received authentication token;

retrieve the first device identifier accessed from the decrypted authentication token;

validate the authentication token, wherein the validating comprises determining whether the first device identifier matches the second, comparison device identifier; and output a response.

9. The non-transitory computer-readable storage medium of claim 8, wherein the response comprises the protected resources if the first device identifier matches the second, comparison device identifier.

10. The non-transitory computer-readable storage medium of claim 8, wherein the response comprises an authentication landing page if the first device identifier does not match the second, comparison device identifier.

11. The non-transitory computer-readable storage medium of claim 8, wherein the device attributes are received using a client-side software development kit.

12. The non-transitory computer-readable storage medium of claim 8, wherein the device attributes are received using a script.

13. The non-transitory computer-readable storage medium of claim 8, wherein the device attributes comprise at least one of a device operating system, a device type, and a device serial number.

14. An apparatus comprising:

a memory;

a processor, wherein the processor executes computer-executable program instructions which cause the processor to:

receive, by an authentication server and from a user device, an authentication request, wherein the authentication request comprises device attributes of the user device and wherein the authentication request further includes login information of a user;

determine, by the authentication server, whether the login information is valid;

responsive to determining that the login information is valid, generate, by the authentication server, a first device identifier identifying the user device from which the authentication request was received using the device attributes of the user device from which the authentication request was received, the first device identifier includes randomly generated characters that uniquely identify the user device from which the authentication request was received and the first device identifier is generated based on the device attributes that uniquely identify the user device from which the authentication request was received;

create, by the authentication server, an authentication token, wherein the authentication token is signed with the first device identifier;

transmit, by the authentication server and to the user device from which the authentication request was received, the authentication token;

receive, by the authentication server, a request to access protected resources from a user device, wherein the request comprises the authentication token and device attributes of the user device from which the request to access protected resources was received;

generate, by the authentication server, a second, comparison device identifier identifying the user device from which the request to access protected resources was received, the second, comparison device identifier being based on the device attributes of the user device from which the request to access protected resources was received and included in the request to access protected resources, the second, comparison device identifier including randomly generated characters that uniquely identify the user device from which the request to access protected resources was received and the second, comparison device identifier is generated based on the device attributes of the user device from which the request to access protected resources was received and included in the request to access protected resources that uniquely identifying the user device from which the request to access protected resources was received;

decrypt, by the authentication server, the received authentication token;

retrieve the first device identifier accessed from the decrypted authentication token;

validate the authentication token, wherein the validating comprises determining whether the first device identifier matches the second, comparison device identifier; and output a response.

15. The apparatus of claim 14, wherein the response comprises the protected resources if the first device identifier matches the second, comparison device identifier.

16. The apparatus of claim 14, wherein the response comprises an authentication landing page if the first device identifier does not match the second, comparison device identifier.

17. The apparatus of claim 14, wherein the device attributes are received using a client-side software development kit.

18. The apparatus of claim 14, wherein the device attributes are received using a script.

19. The apparatus of claim 14, wherein the device attributes comprise at least one of a device operating system, a device type, and a device serial number.

20. The apparatus of claim 14, wherein the login information of the user includes a username and password.

* * * * *